United States Patent [19]

Mark et al.

[11] Patent Number: 4,469,861
[45] Date of Patent: Sep. 4, 1984

[54] POLYCARBONATE COMPOSITION FROM BRANCHED CHAIN DIHYDRIC PHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 453,104

[22] Filed: Dec. 27, 1982

[51] Int. Cl.³ .............................................. C08G 63/62
[52] U.S. Cl. .................................. 528/196; 568/722; 568/723
[58] Field of Search ........................................ 528/196

[56] References Cited

U.S. PATENT DOCUMENTS 4,304,899 12/1981 Mark et al. .......................... 528/196

Primary Examiner—Harold D. Anderson
Attorney, Agent, or Firm—Martin B. Barancik

[57] ABSTRACT

Aromatic polycarbonates derived from (i) a carbonate precursor, and (ii) at least one dihydric phenol represented by the general formula

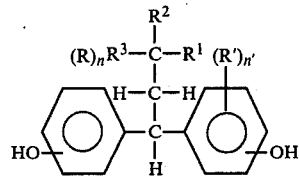

wherein:
  R and R' are independently selected from halogen radicals and monovalent hydrocarbon radicals;
  $R^1$ is selected from hydrogen and alkyl radicals;
  $R^3$ is selected from hydrogen and alkyl radicals;
  $R^2$ is selected from alkyl radicals, with the proviso that when both $R^1$ and $R^3$ are hydrogen then $R^2$ is selected from branched alkyl radicals containing at least three carbon atoms; and
  n and n' are independently selected from whole numbers having a value of from 0 to 4 inclusive.

These polycarbonates are useful in the production of molded articles, films, and sheets.

8 Claims, No Drawings

POLYCARBONATE COMPOSITION FROM BRANCHED CHAIN DIHYDRIC PHENOL

Polycarbonates are well known thermoplastic materials which, due to their many advantageous physical properties, find use as thermoplastic engineering materials in many commercial and industrial applications. The polycarbonates, for example, exhibit excellent properties of toughness, flexibility, impact strength, optical clarity, and heat resistance. The polycarbonates generally may be prepared by the reaction of a dihydric phenol, such as bisphenol-A, with a carbonate precursor, such as phosgene.

There exists a need, however, for polycarbonates exhibiting a greater degree of ductility and greater impact strength than that exhibited by conventional polycarbonate resins; especially for polycarbonates exhibiting improved ductility and impact strength as well as possessing a heat resistance substantially comparable to that exhibited by conventional polycarbonate resins.

Therefore, it is an object of the instant invention to provide polycarbonates exhibiting greater ductility and impact strength than that possessed by conventional polycarbonates. It is another object of the instant invention to provide polycarbonates which exhibit improved ductility and impact strength while exhibiting heat resistances which are generally comparable to those of conventional polycarbonates.

SUMMARY OF THE INVENTION

The instant invention is directed to novel polycarbonates exhibiting improved ductility and impact strength. These polycarbonates are derived from a carbonate precursor and at least one branched dihydric phenol wherein branching occurs at a point at least one carbon atom away from the benzylic carbon atom bridging the phenolic residues.

DESCRIPTION OF THE INVENTION

In accordance with the instant invention there are provided novel polycarbonate resins exhibiting improved ductility and impact strength over conventional polycarbonates. The polycarbonates of the instant invention are prepared by reacting a carbonate precursor with at least one branched dihydric phenol wherein the branching occurs at a carbon atom which is at least one carbon atom removed from the benzylic carbon bridging the phenolic residues.

The branched dihydric phenols utilized in preparing the instant polycarbonates are represented by the general formula

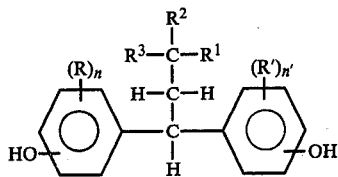

I.

wherein:

R is independently selected from halogen radicals and monovalent hydrocarbon radicals;

R' is independently selected from halogen radicals and monovalent hydrocarbon radicals;

$R^1$ is selected from hydrogen and alkyl radicals;

$R^3$ is selected from hydrogen and alkyl radicals;

$R^2$ is selected from alkyl radicals, with the proviso that if $R^1$ and $R^3$ are both hydrogen then $R^2$ is selected from branched alkyl radicals containing at least 3 carbon atoms; and n and n' are independently selected from whole numbers having a value of from 0 to 4 inclusive.

The preferred halogen radicals represented by R and R' are chlorine and bromine.

The monovalent hydrocarbon radicals represented by R and R' are selected from alkyl radicals, aryl radicals, aralkyl radicals, alkaryl radicals, and cycloalkyl radicals.

The preferred alkyl radicals represented by R and R' are those containing from 1 to about 8 carbon atoms. These preferred alkyl radicals can be either straight chain alkyl radicals or branched alkyl radicals. Some illustrative non-limiting examples of these alkyl radicals include methyl, ethyl, propyl, isopropyl, butyl, tertiary butyl, pentyl, neopentyl, and the like.

The preferred aryl radicals represented by R and R' are those containing from 6 to 12 carbon atoms. These include phenyl, naphthyl, and biphenyl.

The preferred aralkyl radicals and alkaryl radicals represented by R and R' are those containing from 7 to about 14 carbon atoms. Some illustrative non-limiting examples of these aralkyl and alkaryl radicals include tolyl, xylyl, ethylphenyl, and the like.

The preferred cycloalkyl radicals represented by R and R' are those containing from 4 to about 6 ring carbon atoms. Some illustrative non-limiting examples of these cycloalkyl radicals include cyclobutyl, cyclopentyl, cyclohexyl, methylcyclohexyl, and the like.

When more than one R substituent is present on the aromatic residue, i.e., when n is more than one, they may be the same or different. The same is true for the R' substituent. When n and/or n' are zero then only hydrogens are present on the aromatic residue.

The preferred monovalent hydrocarbon radicals represented by R and R' are the alkyl radicals.

The preferred alkyl radicals represented by $R^1$ and $R^3$ are those containing from 1 to about 10 carbon atoms. These preferred alkyl radicals can be either straight chain alkyl radicals or branched alkyl radicals. Some illustrative non-limiting examples of these alkyl radicals include methyl, ethyl, propyl, isopropyl, butyl, isobutyl, tertiarybutyl, pentyl, neopentyl, hexyl, and heptyl.

The preferred alkyl radicals represented by $R^2$ are those containing from 1 to about 20 carbon atoms. If at least one of $R^1$ and $R^3$ is an alkyl radical, then the alkyl radicals represented by $R^2$ may be either straight chain alkyl radicals or branched alkyl radicals. If, however, both $R^1$ and $R^3$ are hydrogen, then the alkyl radicals represented by $R^2$ must be branched alkyl radicals containing from 3 to about 20 carbon atoms. Some illustrative non-limiting examples of straight chain alkyl radicals represented by $R^2$ include methyl, ethyl, propyl, pentyl, heptyl, decyl, dodecyl, pentadecyl, and hexadecyl. Some illustrative non-limiting examples of branched alkyl radicals represented by $R^2$ include isopropyl, isobutyl, tertiarybutyl, neopentyl, 4,4-dimethylhexyl, 4-ethylhexyl, 3-methyl-4-ethylheptyl, 12-methyltetradecyl, 13-methyltetradecyl, 10-methyltetradecyl, 8,8-dimethyldecyl, 4-butyloctyl, 2,3-dimethylbutyl, 5-methyl-4-propylhexyl, and the like.

The preferred dihydric phenols of Formula I are the 4,4'-dihydric phenols.

Some illustrative non-limiting examples of the dihydric phenols represented by Formula I include:

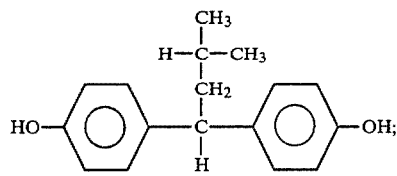

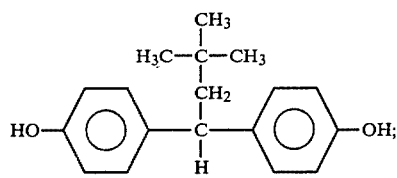

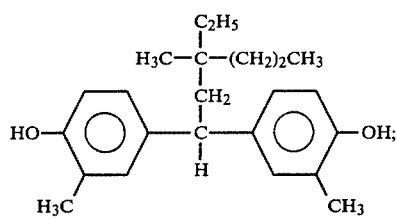

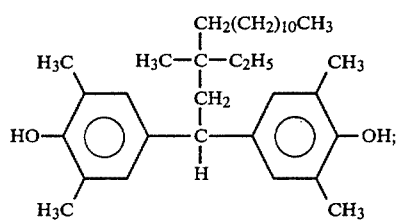

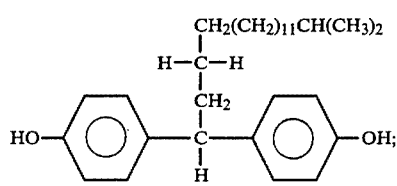

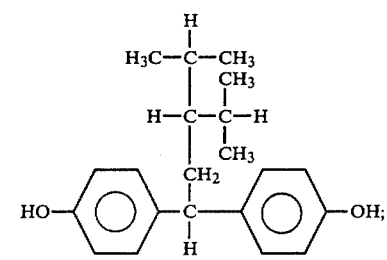

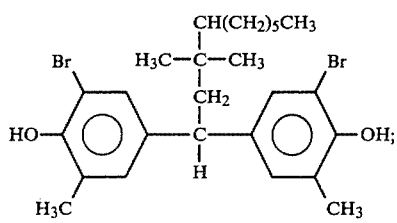

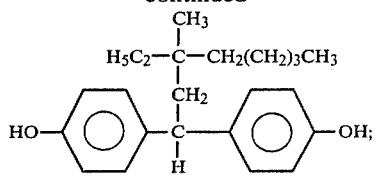

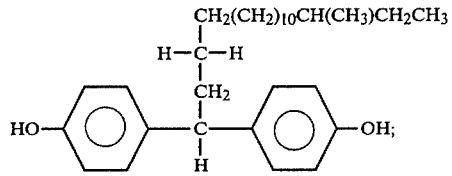

and the like.

The novel dihydric phenols of Formula I are prepared by the reaction of a particular aldehyde with a phenol in the presence of an acid catalyst. The particular aldehyde reactant is represented by the general formula

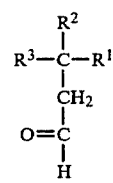     II.

wherein $R^1$, $R^2$ and $R^3$ are as defined hereinafore. The phenol reactant is represented by the general formulae

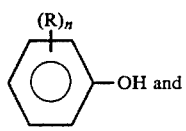     III.

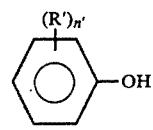     IV wherein R, R', n and n' are as defined hereinafore.

In order to obtain the novel dihydric phenols of Formula I, one mole of an aldehyde of Formula II is reacted with one mole of a phenol of Formula III and one mole of a phenol of Formula IV in the presence of an acid catalyst under conditions of temperature and pressure such that coreaction between the aldehyde and the phenol will occur to form the novel dihydric phenols of Formula I.

The acid catalyst may be hydrochloric acid, hydrobromic acid, sulfuric acid, methanesulfonic acid, trifluoromethane sulfonic acid, benzene sulfonic acid, toluene sulfonic acid, polyphosphoric acid, and ion exchange resin acids such as polystyrene sulfonic acid, and the like. The amount of the catalyst employed is a catalytic amount. By catalytic amount is meant an amount effective to catalyze the reaction between the aldehyde and the phenol to produce the dihydric phenol of Formula I. Generally, this amount is in the range of from about 0.1 to about 10 weight percent.

In general the reaction proceeds satisfactorily at one atmosphere of pressure and at room temperature (25° C.).

The phenols of Formulae III and IV may be the same. In such a case one mole of the aldehyde of Formula II is reacted with two moles of the phenol.

It is often advantageous to use an excess of the phenol reactant and to recover or remove the unreacted phenol at the end of the reaction.

In the preparation of the carbonate polymers of the instant invention only one dihydric phenol of Formula I may be used. Alternately, a mixture of two or more different dihydric phenols of Formula I may be employed.

The carbonate precursor which is employed can be a carbonyl halide, a diaryl carbonate, or a haloformate. The carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishalformate of ethylene glycol, neopentyl glycol, polyethylene glycol, etc.) When using bishaloformates, equimolar amounts of free dihydric phenols are required to effect polymeriation. When polymerizing monohaloformates of diphenols no free diphenol is required. The diaryl carbonates include diphenyl carbonate, di(halophenyl)carbonates such as di(chlorophenyl)carbonate, di(bromophenyl)carbonate, di(trichlorophenyl)carbonate, etc., di(alkylphenyl) carbonates such as di(tolyl)carbonate, etc., di(naphthyl)carbonate, di(chloronaphthyl)carbonate, and the like. The preferred carbonate precursor is carbonyl chloride, also known as phosgene.

The novel carbonate polymers of the instant invention contain at least one repeating structural unit represented by the general formula

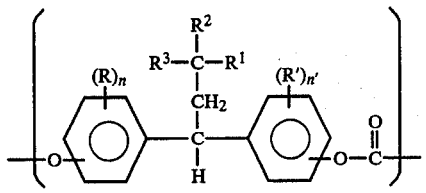

V.

wherein R, R', $R^1$, $R^2$, $R^3$, n and n' are as defined hereinafore.

One method of preparing the aromatic carbonate polymers of the instant invention involves the heterogeneous interfacial polymerization technique utilizing an aqueous caustic solution, an organic water immiscible solvent such as methylene chloride, at least one dihydric phenol of Formula I, a carbonate precursor such as phosgene, a catalyst, and a molecular weight regulator, and water.

Another useful method for preparing the carbonate polymers of the instant invention involves the use of an organic solvent system that also functions as an acid acceptor, at least one dihydric phenol represented by Formula I, a molecular weight regulator, water, and a carbonate precursor such as phosgene.

The catalysts which may be employed herein are any of the suitable catalysts that aid the polymerization reaction of the dihydric phenol with the carbonate precursor to produce the polycarbonates. Suitable polymerization catalysts include, but are not limited to, tertiary amines such as triethylamine, quaternary ammonium compounds, and quaternary phosphonium compounds.

The molecular weight regulators employed may be any of the well known compounds that regulate the molecular weight by a chain terminating mechanism. These compounds include, but are not limited to, phenol, tertiary butyl phenol, Chroman-I, and the like.

The temperature at which the phosgenation reaction proceeds may vary from below 0° C. to above 100° C. The reaction proceeds satisfactorily at temperatures from room temperature (25° C.) to about 50° C. Since the reaction is exothermic, the rate of phosgene addition may be used to control the reaction temperature.

The high molecular weight aromatic carbonate polymers of the instant invention generally have a weight average molecular weight in the range of from about 5,000 to about 200,000, preferably from about 10,000 to about 100,000.

The instant polycarbonates exhibit a broad spectrum of properties. These properties range from high impact strengths, high ductility, and elastomeric characteristics at one end to impact strengths and ductilities which are improved over those possessed by conventional polycarbonates such as bisphenol-A polycarbonates, and heat resistances (as exemplified by second order glass transition temperature, Tg) generally comparable to those exhibited by these conventional polycarbonates, at the other end of the spectrum. Thus, for example, at one end of the spectrum are the properties exhibited by polycarbonates of the instant invention where $R^1$ and $R^3$ are both hydrogen and $R^2$ is a relatively long chain branched alkyl radical. These polycarbonates exhibit high impact strengths, high ductilities, and elastomeric characteristics (exemplified, in part, by relatively low Tg's). At the other end of the spectrum are the properties exhibited by polycarbonates of the instant invention wherein $R^1$, $R^2$ and $R^3$ are all relatively short chain alkyl radicals, either branched or straight chain. These polycarbonates exhibit improved impact strengths and ductilities as compared to conventional polycarbonates such as bisphenol-A polycarbonate, and heat resistances which are generally comparable to those of conventional polycarbonates.

As has been discussed above, the polycarbonates of the instant invention exhibit many and various properties. Such being the case, a particular carbonate polymer may be selected to especially suit a given use or an intended purpose. Thus, the carbonate polymers of the instant invention, because of their myriad properties, may respectively fit a multiformity of specific usages.

The carbonate polymers of the instant invention may optionally have admixed therewith certain commonly known and used additives such as antioxidants; antistatic agents; fillers such as glass fibers, talc, mica, clay; impact modifiers; ultraviolet radiation absorbers such as the benzophenones, benzotriazoles and cyanoacrylates; plasticizers; hydrolytic stabilizers such as the epoxides disclosed in U.S. Pat. Nos. 3,489,716, 4,138,379 and 3,839,247, all of which are incorporated herein by reference; color stabilizers such as the organophosphites; flame retardants; and the like.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399;

3,917,559; 3,951,910 and 3,940,366, all of which are incorporated herein by reference.

Also contemplated as falling with the scope of the instant invention are carbonate polymers derived from (i) a carbonate precursor, (ii) at least one dihydric phenol of Formula I, and (iii) at least one conventional dihydric phenol. The conventional dihydric phenols are well known in the prior art and are generally commercially available or may be readily prepared by known methods. Some illustrative non-limiting examples of these conventional dihydric phenols include:
1,1-bis(4-hydroxyphenyl)ethane;
2,2-bis(4-hydroxyphenyl)propane (bisphenol-A);
2,2-bis(4-hydroxy-3-methylphenyl)propane;
2,2-bis(4-hydroxy-3-chlorophenyl)propane;
1,1-bis(4-hydroxyphenyl)cyclohexane;
p,p'-dihydroxydiphenyl;
3,3'-dichloro-4,4'-dihydroxydiphenyl; and the like.

The instant invention also encompasses blends comprised of (i) at least one polycarbonate resin of the instant invention, and (ii) at least one conventional polycarbonate resin. The conventional polycarbonate resins which are used to form the instant blends are derived from a carbonate precursor and a conventional dihydric phenol of the type described above.

Another embodiment of the instant invention is copolyester-carbonates derived from (i) a carbonate precursor, (ii) at least one dihydric phenol represented by Formula I, and (iii) at least one difunctional carboxylic acid or a reactive derivative thereof.

Briefly stated, the copolyester-carbonates comprise recurring carbonate groups

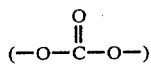

carboxylate groups

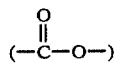

and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonates contain ester bonds and carbonate bonds in the polymer chain, wherein the amount of ester bonds is in the range of from about 25 to about 90 mole percent, preferably from about 35 to about 80 mole percent, relative to the amount of the carbonate bonds. For example, 5 moles of bisphenol-A reacting completely with 4 moles of isophthaloyl dichloride and one mole of phosgene would give a copolyester-carbonate of 80 mole percent ester bonds.

Conventional copolyester-carbonates in general, and methods for their preparation, are disclosed in U.S. Pat. No. 3,169,121.

In general, any difunctional carboxylic acid conventionally used in the preparation of linear polyesters may be utilized in the preparation of the copolyester-carbonate resins of the instant invention. The carboxylic acids which may be used include the aliphatic carboxylic acids, the aliphatic-aromatic carboxylic acids, and the aromatic carboxylic acids. These acids are disclosed in U.S. Pat. No. 3,169,121.

The difunctional carboxylic acids which may be utilized in the preparation of the copolyester-carbonate resins of the instant invention generally conform to the general formula

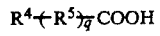

wherein $R^5$ is an alkylene, alkylidene, aralkylene, aralkylidene or cycloaliphatic group; an alkylene, alkylidene or cycloaliphatic group containing ethylenic unsaturation; an aromatic group such as phenylene, biphenylene, substituted phenylene, naphthylene, and the like; two or more aromatic groups connected through non-aromatic linkages such as alkylene or alkylidene groups; and the like. $R^4$ is either a carboxyl group or a hydroxyl group. The letter q represents one where $R^4$ is a hydroxyl group and either zero or one where $R^4$ is a carboxyl group. Preferred difunctional carboxylic acids are the aromatic difunctional carboxylic acids, i.e., those acids of Formula VI where q is one, $R^4$ is a carboxyl or a hydroxyl group, and $R^5$ is an aromatic group such as phenylene, biphenylene, naphthylene, substituted phenylene, and the like. The preferred aromatic difunctional carboxylic acids are those represented by the general formula

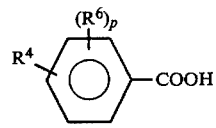

wherein $R^4$ is as defined above; $R^6$ is independently selected from halogen radicals and monovalent hydrocarbon radicals; and p represents a whole number having a value of from 0 to 4 inclusive.

The preferred halogen radicals represented by $R^6$ are chlorine and bromine.

The monovalent hydrocarbon radicals represented by $R^6$ are selected from alkyl radicals, aryl radicals, aralkyl radicals, alkaryl radicals, and cycloalkyl radicals. The preferred alkyl radicals, aryl radicals, aralkyl radicals, alkaryl radicals and cycloalkyl radicals represented by $R^6$ are the same as those defined for R and R' hereinafore. The preferred monovalent hydrocarbon radical represented by $R^6$ is an alkyl radical.

When more than one $R^6$ substituent is present on the aromatic residue, i.e., when p is more than one, they may be the same or different.

Mixtures of two or more different difunctional carboxylic acids can be employed as well as single individual difunctional carboxylic acids.

Particularly useful aromatic difunctional carboxylic acids are isophthalic acid, terephthalic acid, and mixtures thereof.

Rather than utilizing the difunctional carboxylic acids per se, it is possible, and sometimes even preferred, to employ their reactive derivatives such as, for example, the acid halides. Particularly useful acid halides are the acid chlorides. Thus, for example, instead of using isophthalic acid, terephthalic acid, and mixtures thereof, it is possible to employ isophthaloyl dichloride, terephthaloyl dichloride, and mixtures thereof.

One of the methods for preparing the copolyestercarbonates of the instant invention involves the heterogeneous interfacial polymerization process utilizing an aqueous caustic solution, water, an organic water immiscible solvent, at least one dihydric phenol of Formula I, at least one difunctional carboxylic acid or a reactive derivative thereof, a carbonate precursor, a catalyst, and a molecular weight regulator. A preferred heterogeneous interfacial polymerization system is one which utilizes phosgene as the carbonate precusor and methylene chloride or chlorobenzene as the organic solvent.

The reaction conditions, catalysts, and chain terminators or molecular weight regulators, utilized are generally the same as those described hereinafore for the preparation of the polycarbonates.

The properties of the instant copolyestercarbonates are many and various. Thus, for example, at one extreme are the properties exhibited by a copolyester-carbonate resin derived from a dihydric phenol of Formula I wherein both $R^1$ and $R^3$ are hydrogen and $R^2$ is a relatively long chain branched alkyl radical. These copolyester-carbonates will exhibit high impact strength, high ductility, and elastomeric characteristics. At the other extreme are the properties exhibited by a copolyester-carbonate derived from a dihydric phenol of Formula I where $R^1$, $R^2$ and $R^3$ are all relatively short chain alkyl radicals, either straight chain or branched alkyl radicals. These copolyester-carbonates exhibit improved impact strength and ductility as compared to conventional copolyester-carbonates such as those prepared from bisphenol-A, and comparable Tgs to the conventional copolyester-carbonates. Intermediate these two extremes are copolyester carbonates, such as those wherein $R^1$ is hydrogen, $R^3$ is a relatively short chain alkyl radical, and $R^2$ is a moderately long chain alkyl radical, which exhibit properties that fall between those described above (e.g., higher Tgs than those of the copolyester-carbonates derived from dihydric phenols wherein $R^1$ and $R^3$ are hydrogen and $R^2$ is a long chain branched alkyl but lower Tgs than those of the resin derived from a dihydric phenol wherein all of $R^1$, $R^2$, and $R^3$ are relatively short chain alkyl radicals; impact strengths and ductilities falling intermediate these two extremes; and less elastomeric characteristics than exhibited by the copolyester carbonate derived from a dihydric phenol containing the long chain branched alkyl radical, but more elastomeric properties than that exhibited by the copolyester-carbonate derived from a dihydric phenol wherein all of $R^1$, $R^2$ and $R^3$ are all short chain alkyl radicals).

Because the instant copolyester-carbonate resins exhibit many and various properties a particular resin may be selected to especially suit a given use or intended purpose. Thus, the copolyester-carbonates of the instant invention, because of their myriad properties, may respectively fit a multitude of specific uses.

The copolyester-carbonates of the instant invention may optionally contain admixed therewith the aforedescribed additives.

Also envisaged as being within the scope of the instant invention are copolyester-carbonate resins derived from (i) a carbonate precursor, (ii) at least one dihydric phenol of Formula I, (iii) at least one difunctional carboxylic acid or a reactive derivative thereof, and (iv) at least one conventional dihydric phenol of the type described hereinafore.

The instant invention also encompasses blends comprised of (i) at least one copolyester-carbonate resin of the instant invention, and (ii) at least one conventional copolyester-carbonate resin. The conventional copolyester carbonate resins are derived from a carbonate precursor, at least one conventional dihydric phenol, and at least one difunctional carboxylic acid or a reactive derivative thereof.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis, unless otherwise indicated.

The following example illustrates the preparation of the novel dihydric phenol of the instant invention.

EXAMPLE 1

This example illustrates the preparation of 4,4'-(3-methylbutylidene)bisphenol.

Into a 1 liter glass reactor, equipped with a stirrer, reflux condenser, thermometer and gas-inlet tube, were charged 752.6 grams (8.0 moles) of phenol and 68.9 grams (0.8 mole) of isovaleraldehyde. The phenol was melted by the application of heat to the reactor via a heating mantel. Into the well stirred solution was introduced, slowly, hydrogen chloride gas. The heating mantel was replaced with an ice-water bath which was used to keep the temperature of the ensuing exothermic reaction between 30° and 36° C. After about 30 minutes, the introduction of hydrogen chloride was terminated and the clear, red reaction mixture was sampled for gas chromatographic analysis. This indicated that all of the starting aldehyde had reacted. Excess phenol was stripped off in a water aspirator vacuum and the residue crystallized with charcoaling from benzene. The white crystals were analyzed by gas chromatography, which indicated the following composition: 2,2'-isomer, 0.6%; 2,4'-isomer, 6.8%; 4,4'-(3-methylbutylidene)bisphenol, 91.4%. One more recrystallization increased the 4,4'-isomer content to 97.0%, which had a melting point of 153°–154° C.

The following example illustrates the preparation of a polycarbonate resin of the instant invention.

EXAMPLE 2

Into a mixture of 25.6 grams (0.1 mole) of 4,4-(3-methylbutylidene)bisphenol prepared substantially in accordance with the procedure of Example 1, 0.4 gram of triethylamine, 400 milliliters of methylene chloride, and 300 milliliters of water is introduced, at ambient temperature and a pH of about 11, phosgene at the rate of 0.5 gram per minute for a period of 20 minutes while maintaining the pH of the two phase system at about 11 by the addition of a 25% aqueous sodium hydroxide solution. To this reaction mixture is added 0.2 gram of phenol. After the introduction of the phosgene is completed the methylene chloride phase is separated from the aqueous phase, washed with an excess of dilute (0.01N) aqueous HCl and then washed three times with deionized water. The polymer is then precipitated with methanol. The resultant polymer has a second order glass transition temperature (Tg) of 144.3° C.

The following example illustrates the preparation of a copolyester-carbonate resin of the instant invention.

EXAMPLE 3

Into a reaction mixture consisting of 25.6 grams (0.1 mole) of 4,4'-(3-methylbutylidene)bisphenol, 0.2 gram (2.0 mole %) of triethylamine, 0.18 gram (2.0) mole % of phenol, 400 milliliters of methylene chloride, and 300 milliliters of water, is added dropwise a solution of 4.1 grams (0.02 mole) of isophthaloyl dichloride in 5.0 grams of methylene chloride, while the pH is maintained at 11 by the addition of an aqueous sodium hydroxide solution via an automatic titrator. When consumption of the base stops, phosgene is introduced at a rate of 0.5 gram per minute for 20 minutes. The methylene chloride phase is separated from the aqueous phase, washed with an excess of dilute (0.01N) aqueous hydrochloric acid, and then washed three times with deionized water. The polymer is precipitated by methanol and dried at 95° C. The resultant copolyester-carbonate resin, which has an intrinsic viscosity in methylene chloride at 25° C. Of 0.932 dl/gm, and exhibits a Tg of 153.6° C.

Example 2 illustrates that a polycarbonate resin derived from a dihydric phenol of Formula I wherein $R^1$ and $R^2$ are short chain alkyl radicals, and $R^3$ is a hydrogen radical has a Tg of 144.3° C. A conventional polycarbonate derived from bisphenol-A and phosgene has a Tg of 149° C. Thus, this carbonate polymer of the instant invention exhibits a Tg which is generally in the range of the Tgs exhibited by conventional polycarbonates.

Obviously, other modifications and variations of the present invention are possible in light of the above teachings. It is, therefore, to be understood that changes may be made in the particular embodiment of the invention described which are within the full intended scope of the invention as defined by the appended claims.

What is claimed is:

1. Polycarbonate resin derived from:
   (i) a carbonate precursor; and
   (ii) at least one dihydric phenol represented by the general formula

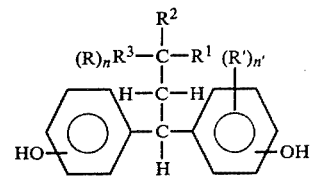

wherein:
R is independently selected from halogen radicals;
R' is independently selected from halogen radicals;
$R^1$ is selected from alkyl radicals containing from 1 to about 10 carbon atoms or hydrogen;
$R^3$ is selected from alkyl radicals containing from 1 to about 10 carbon atoms or hydrogen;
$R^2$ is selected from alkyl radicals containing from 1 to about 20 carbon atoms, with the proviso that when $R^1$ and $R^3$ are both hydrogen then $R^2$ is selected from branched alkyl radicals containing from at least 3 carbon atoms to about 20 carbon atoms; and
n and n' are independently selected from whole numbers having a value of from 0 to 4 inclusive.

2. The resin of claim 1 wherein $R^1$ and $R^3$ are independently selected from alkyl radicals.

3. The resin of claim 2 wherein said alkyl radicals represented by $R^2$ contain from 1 to about 20 carbon atoms.

4. The resin of claim 1 wherein $R^1$ is hydrogen and $R^3$ is an alkyl radical.

5. The resin of claim 4 wherein said alkyl radical represented by $R^2$ contains from 1 to about 20 carbon atoms.

6. The resin of claim 1 wherein both $R^1$ and $R^3$ are hydrogen.

7. The resin of claim 6 wherein $R^2$ is selected from branched alkyl radicals containing from 3 to about 20 carbon atoms.

8. The resin of claim 1 wherein said carbonate precursor is phosgene.

* * * * *